US010190476B2

(12) United States Patent
Fangauer

(10) Patent No.: US 10,190,476 B2
(45) Date of Patent: Jan. 29, 2019

(54) ELECTROMAGNETIC VALVE AND INTERNAL COMBUSTION ENGINE COOLING SYSTEM WITH ELECTROMAGNETIC VALVE

(71) Applicant: ETO Magnetic GmbH, Stockach (DE)

(72) Inventor: Philipp Fangauer, Constance (DE)

(73) Assignee: ETO Magnetic GmbH, Stockach (DE)

( * ) Notice: Subject to any disclaimer, the term of this patent is extended or adjusted under 35 U.S.C. 154(b) by 83 days.

(21) Appl. No.: 15/116,516

(22) PCT Filed: Dec. 16, 2014

(86) PCT No.: PCT/EP2014/078000
§ 371 (c)(1),
(2) Date: Oct. 26, 2016

(87) PCT Pub. No.: WO2015/117707
PCT Pub. Date: Aug. 13, 2015

(65) Prior Publication Data
US 2017/0037768 A1 Feb. 9, 2017

(30) Foreign Application Priority Data
Feb. 5, 2014 (DE) .................... 10 2014 101 437

(51) Int. Cl.
F01P 7/14 (2006.01)
F16K 17/04 (2006.01)
(Continued)

(52) U.S. Cl.
CPC .............. F01P 7/14 (2013.01); F01P 7/167 (2013.01); F16K 15/18 (2013.01); F16K 17/048 (2013.01);
(Continued)

(58) Field of Classification Search
CPC .... F01P 2007/146; F01P 2031/00; F01P 7/14; F16K 17/048
(Continued)

(56) References Cited

U.S. PATENT DOCUMENTS 4,611,631 A   9/1986   Kosugi et al.
5,167,442 A   12/1992  Alaze et al.
6,250,725 B1  6/2001   Schnalzger et al.

FOREIGN PATENT DOCUMENTS

DE   40 16 749 A1   11/1991
DE   41 29 638 A1   3/1993
(Continued)

Primary Examiner — Henry T Crenshaw
(74) Attorney, Agent, or Firm — Bachman & LaPointe, PC

(57) ABSTRACT

A solenoid valve (1), in particular for closing a bypass in a coolant circuit of an internal combustion engine, with an energizable winding (3) and an armature (2) that is adjustable in the direction of a core by energizing the winding, which armature (2) force-loads a valve plunger (8) with energized winding (3) in the direction of a closing position, in particular against the spring force of a resetting spring (18), wherein when the armature (2) is energized a pin (12) which is adjustable together with the armature for adjusting the valve plunger (8) in the direction of the closing position is provided, by way of which the valve plunger (8) by way of adjusting the armature (2) upon energization can be force-loaded in the direction of the closing position, and which is spring force-loaded by a pressure limiting spring (13) in the direction of the closing position of the valve plunger (8) and which by way of the valve plunger (8) upon an axial valve plunger movement of the valve plunger (8) out of its closing position is adjustable for opening the solenoid valve (1) despite the armature (2) that is adjustable in the direction of the core (6) against the spring force of the pressure limiting spring (13).

15 Claims, 3 Drawing Sheets

(51) Int. Cl.
*F16K 31/06* (2006.01)
*F01P 7/16* (2006.01)
*F16K 15/18* (2006.01)

(52) U.S. Cl.
CPC ...... *F16K 31/0655* (2013.01); *F16K 31/0665* (2013.01); *F01P 2007/146* (2013.01); *F01P 2031/00* (2013.01)

(58) Field of Classification Search
USPC ...................................................... 236/34.5
See application file for complete search history.

(56) References Cited

FOREIGN PATENT DOCUMENTS

| | | |
|---|---|---|
| DE | 42 34 749 A1 | 4/1994 |
| DE | 44 38 336 A1 | 5/1996 |
| DE | 4438334 A1 | 5/1996 |
| DE | 198 15 778 A1 | 10/1999 |

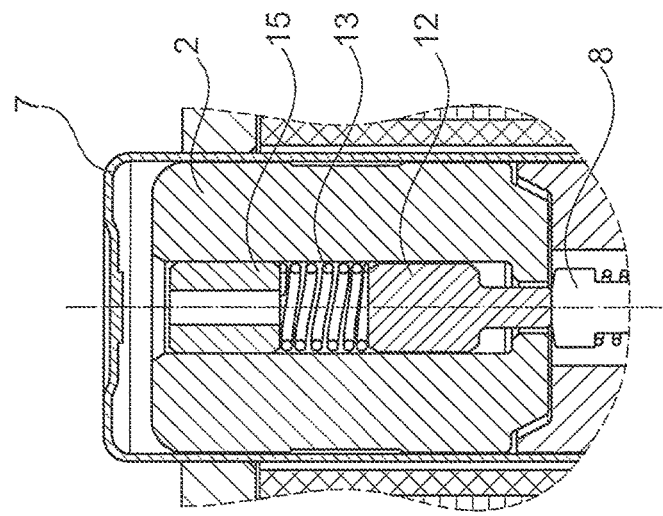
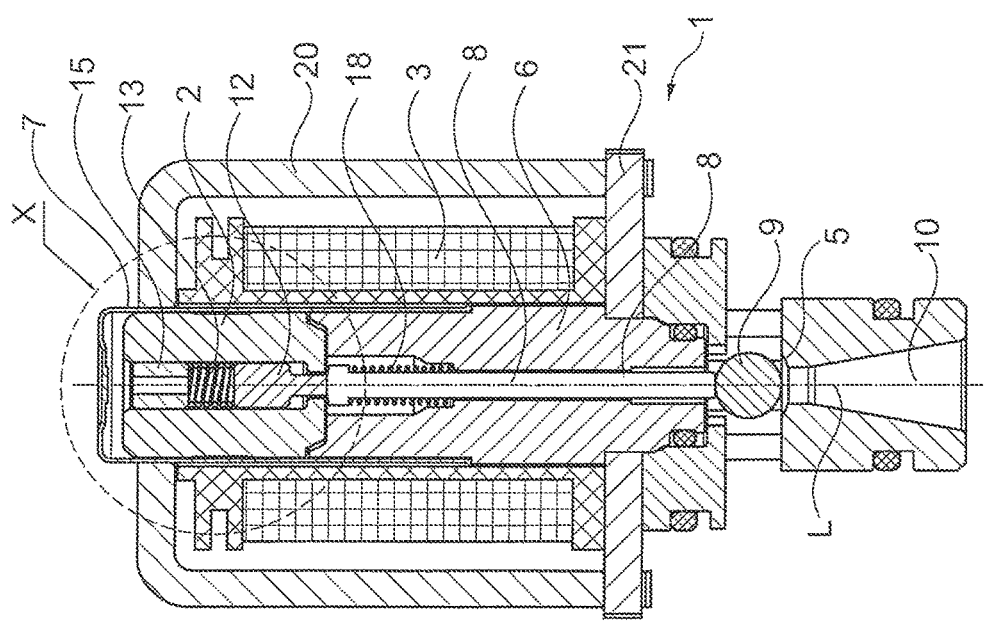

ELECTROMAGNETIC VALVE AND INTERNAL COMBUSTION ENGINE COOLING SYSTEM WITH ELECTROMAGNETIC VALVE

BACKGROUND OF THE INVENTION

The invention relates to a preferentially voltage-controlled solenoid valve, in particular for closing a bypass in a coolant circuit of an internal combustion engine, with an energizable winding and an armature that is adjustable in the direction of a core by energizing the winding, which force-loads a valve plunger with energized winding in the direction of a closing position, in particular against the spring force of a resetting spring. Furthermore, the invention relates to an internal combustion engine cooling system.

Coolant systems for motor vehicle internal combustion engines usually comprise two different-sized cooling water circuits between which it is possible to change over as a function of the vehicle engine temperature. Here, the cooling water is usually delivered by means of a cooling water pump in a so-called small cooling water circuit in order to bring the vehicle engine up to an optimal operating temperature more rapidly and thereby reduce emissions. Thereafter, the cooling water is usually delivered in a so-called large cooling water circuit, as a result of which the vehicle engine is cooled more in order to avoid overheating. It is known for switching over between the cooling water circuits to employ a valve slide which can be hydraulically actuated with cooling water. To this end, a switching chamber into which cooling water is admitted is connected to the cooling water tank by way of a bypass line and cooling water is continuously delivered into the switching chamber by way of a small fluid pump, in particular a piston pump. In order to actuate the slide, the bypass line to the cooling water tank is closed by means of a solenoid valve so that the pressure in the switching chamber rises since cooling water continues to be delivered into the switching chamber by way of the aforementioned small pump. When the fluid pressure in the switching chamber exceeds a predefined critical pressure value, the armature of the solenoid is adjusted against the active solenoid force so that the solenoid valve opens and for purposes of reducing the pressure, cooling water can flow in the direction of the cooling water tank by way of the bypass that is now opened again. Since the solenoid valve used is a voltage-controlled switching valve, the magnetic force in the past had to be designed so that the solenoid valve at a predetermined minimal electrical voltage and a maximum temperature can still hold the required minimum pressure in the switching chamber so that the slide does not open the large cooling water circuit. However, this results in that the magnet valve at a maximum voltage and a minimum temperature generates a significantly higher closing force and the pressure in the switching chamber (slide chamber) can rise impermissibly high.

Starting out from the aforementioned prior art, the invention is based on the object of creating a device which in a simple design and installation space-optimised manner can be employed in order to prevent impermissible excess pressure in a switching chamber of a cooling system. Furthermore, the object consists in stating a correspondingly optimised internal combustion engine cooling system.

SUMMARY OF THE INVENTION

With respect to the device, this object is solved with a solenoid valve having the features as disclosed herein and with respect to the internal combustion engine cooling system with the features as disclosed herein. Advantageous further developments of the invention are stated in the subclaims. All combinations of at least two features disclosed in the description, the claims and/or the figures fall within the scope of the invention.

To avoid repetitions, features which are disclosed with respect to the device shall also be considered and claimable disclosed with respect to the method. Likewise, features disclosed with respect to the method shall also be considered disclosed and claimable with respect to the device.

The invention has recognised that for limiting a maximum fluid pressure a pressure limiting valve can be provided. Furthermore, the invention has recognised that it is unfavourable to accommodate such an (additional) pressure limiting valve in a coolant pump housing since for this purpose a further bypass for the pressure limiting valve would be required in addition to the bypass that can be opened and closed with the solenoid valve, which would result in a substantial design effort. In addition to this, the installation space requirement would increase a fundamental change of the coolant medium pump housing (in particular water pump housing) would be necessary, as a result of which the design effort would further increase again. To minimise the installation space requirement and for realising a surprisingly simple design solution the invention therefore proposes to ingrate the pressure limiting valve or a pressure limiting functionality into the solenoid valve, namely by providing a pin that is adjustable together with the armature and a pressure limiting spring which loads the pin with a spring force in the direction of the valve plunger. In contrast with the known solenoid valve without pressure limiting function, the armature, in the case of the solenoid valve designed according to the concept of the invention, no longer directly works together with the valve plunger in order to move the same into its closing position, but merely indirectly by way of the pin which is adjustable together with the armature when the armature is energized. The previously mentioned pressure limiting spring, which loads the pin with a spring force in the direction of the valve plunger makes it possible here that the valve plunger when loaded with the compressive force, in particular because of a coolant fluid pressure in a switching chamber is axially adjusted, by realising an adequately (further) preload travel from its closing position against the spring force of the pressure limiting spring and because of this opens the solenoid valve although the solenoid winding is still energized and the armature adjusted in the direction of the core. Thus, when integrating the solenoid valve designed according to the concept of the invention with pressure limiting means in an internal combustion engine cooling system the bypass opens as a result of which the cooling medium can flow out of the switching chamber, in particular in the direction of a coolant tank or storage container and the pressure in the switching chamber can thereby be limited or removed. In an internal combustion engine cooling circuit with a magnet valve designed according to the concept of the invention a separate discharge line or a separate bypass for discharging the cooling medium when a critical pressure is exceeded, in that the bypass that is provided anyway for discharging the cooling medium out of the switching chamber is opened by way of non-energizing the solenoid winding of the solenoid valve and is utilised for discharging the cooling medium at critical excess pressure.

The solenoid valve designed according to the concept of the invention is preferably suitable, as described, for use in internal combustion engine cooling systems, but is not restricted to this use. By integrating the pressure limiting functionality according to the invention in the solenoid valve, the static opening pressure of the valve—independently applied magnetic force—can be selected virtually freely through the selection and/or the preload dimension of the pressure limiting spring. In addition to this it is possible to integrate the pressure limiting function with minimised installation space, in particular installation space-neutrally in the solenoid valve.

The solenoid valve designed according to the concept of the invention is basically suitable for all voltage-controlled NO switching valve applications, in the case of which closing has to be performed against a certain pressure but because of electrical voltage-temperature tolerances an additional pressure limiting valve should/would have to be employed to protect the system.

So as not having to accept or, at worst, only minor restrictions of the valve function through an elevated pressure drop in the opened, dropped-out (not energized) state by integrating the pressure limiting functionality in the solenoid valve, means for maintaining a minimum pressure limiting spring preload are provided as a further development of the invention. In other words, it is achieved through suitable arrangement of the pressure limiting spring, that the pressure limiting spring in the dropped-out state is not impermissibly elongated which would reduce the valve stroke and lead to a greater pressure drop with opened valve. A greater pressure drop would for example result when the pressure limiting spring, which is basically possible within the scope of the solenoid valve according to the invention, without further measures, were to be arranged axially between the armature and the pin or if a pressure limiting spring were to be arranged directly between armature and valve plunger. To minimise and preferably avoid an increased pressure drop in the opened, dropped-out state of the armature it is preferred according to a further development to arrange the pin in an armature bore of the armature, as will still be explained in detail later on, preferentially together with the pressure limiting spring. Alternatively it is conceivable but more elaborate in terms of design to integrate the pin and the compression spring not in the armature but in a cage arranged between the armature and the valve plunger, which prevents an impermissible elongation of the compression spring.

The first version is suitable in particular for comparatively small solenoid valves with low magnetic force and has the advantage of a minimised axial length.

As already indicated, an embodiment of the solenoid valve is particularly preferred in which the axially adjustable pin is integrated in the armature and for this purpose received in a preferably axial armature bore. Here it is particularly preferred when the pin with maximally relaxed compression spring axially protrudes over the armature in the direction of the valve plunger in order to support itself on the same, alternatively it is conceivable that the valve plunger projects into the armature a certain distance.

It is particularly practical now when the pressure limiting spring which is arranged preferentially together with the pin in the continuously cylindrical or preferably stepped armature bore (central passage opening) axially spring forceloads the pin against a stop (pin stop) which is formed on the armature, in particular within the armature bore, wherein the stop is preferably formed by a shoulder, in particular an annular shoulder of an armature bore having at least two diameters.

On the side facing away from the pin, the pressure limiting spring preferably supports itself on an abutment element which is preferably fixed (indirectly or directly) on the armature, in particular pressed into the armature bore, which is preferably a bush, preferentially a press-in bush, wherein the axial position of the abutment element, in particular a press-in depth of the abutment element in the armature bore, determines the preload of the pressure limiting spring, which can then be adjusted and/or is adjusted by way of the selection of this axial position.

The abutment element need not of necessity be fixed by way of press-in—conceivable is also peening-over, flanging or in the case threats are provided, by screwing.

Further fixing possibilities can be alternatively realised. As mentioned at the outset it is possible, when the axial length of the solenoid valve plays a subordinate role and preferentially a larger winding for generating greater magnetic forces is employed, to integrate the pressure limiting spring and the pin not in the armature but in a cage that is arranged axially between the armature and the valve plunger, which cage serves to maintain a defined minimum preload of the pressure limiting spring. It is particularly practical when the cage with compression spring and pin upon suitable energization of the armature is adjusted by the same at least in portions into the core, preferentially at least approximately, completely, when the valve plunger is in its closing position.

To adjust the preload of the pressure limiting spring it is advantageous when the same supports itself on an abutment element on the side facing away from the pin, in particular a bush, preferably a press-in bush, which (indirectly or directly) is fixed on and/or in the cage.

With respect to the dimensioning of the pressure limiting spring it is advantageous when the spring force of the pressure limiting spring with the armature adjusted in the direction of the core and supported in particular on the core, at any rate with the valve plunger located in the closing position, is greater than the spring force of the resetting spring.

With respect to minimising the axial length it is advantageous when the pin directly interacts with the valve plunger without a force transmission component arranged in between.

In principle it is conceivable that the valve plunger directly interacts with the valve seat, in particular for closing a bypass in an internal combustion engine cooling system. With respect to an optimised sealing function it is advantageous, however, when the valve plunger interacts with a closing body, in particular a valve ball, which presses the valve plunger in its closing position into the valve seat and thereby closes the valve with energized winding.

As already mentioned, it is particularly practical when the solenoid valve is voltage-controlled, wherein even further preferred the control voltage is predetermined and/or provided by temperature measurement means which for example measure the temperature of a cooling medium. In this regard, a system is to be disclosed and claimable in which a solenoid valve designed according to the concept of the invention is or will be activated by way of different-size electric voltages.

In the non-energized (dropped-out) state, the solenoid valve designed according to the concept of the invention behaves in the same way as a version according to the prior art without pressure limiting functionality, the magnetic flux circuit or the magnetic force that is generatable by energizing the solenoid winding and the pressure limiting valve are preferably designed so that even in the attracted state with a low or minimally necessary control voltage, for example 9.8 V, for closing the valve, the solenoid valve can be opened when the compressive forces which directly or preferentially indirectly act on the valve plunger via the closing body become greater than the magnetic force acting on the armature.

Preferably, the magnetic flux circuit (in particular through suitable dimensioning of the winding) and the pressure limiting spring are designed, furthermore, so that with a maximum or maximally permissible activation voltage, for example of 16 V, the magnetic force is so great that the same cannot be overcome by the compressive force at a critical pressure in a slide chamber (or other pressure chamber), but indeed the compressive force of the pressure limiting spring, so that the solenoid valve despite energized winding or armature adjusted in the direction of the core opens in that the valve plunger, is adjusted relative to the armature which is then preferentially unmoved, against the compressive force of the compression spring axially out of the closing position in the direction of the armature, and in the process adjusts the pin against the pressure limiting spring in order to open the solenoid valve despite energization, and in the process avoid impermissible pressures in a region in front of the valve seat. The adjustment of the valve plunger is made possible since with the armature adjusted in the direction of the core, the pressure limiting spring can be preloaded (even further) by adjusting the pin. Thus, the magnetic force no longer has to be overcome for opening the valve but merely the force that is stored in the pressure limiting spring.

On the whole, the static opening pressure of the valve depends on the spring force of the pressure limiting spring. Preferably, the resetting spring is dimensioned so that the armature, with the electric voltage that is minimally necessary for closing the solenoid valve with the valve plunger located in the closing position is axially spaced from the core by way of a residual air gap and supports itself, with maximum permissible voltage on the core, in particular by way of a non-stick disc or a non-stick groove, so that with maximum permissible voltage the residual air gap is thus overcome once more.

The invention also leads to an internal combustion engine cooling system with a solenoid valve designed according to the concept of the invention. The internal combustion engine cooling system comprises a (large) cooling medium pump for circulating the cooling medium, in particular cooling water, in a large and/or small coolant circuit, wherein between the different coolant circuits it is possible to change by means of a hydraulically actuatable slide which is actuatable via a cooling medium pressure in a switching chamber. This switching chamber, more precisely a bypass leading out of the switching chamber, which preferentially leads to a cooling medium tank, is assigned a solenoid designed according to the concept of the invention with integrated pressure limiting functionality, with the solenoid valve closed by energizing the solenoid winding the bypass is closed and the pressure in the switching chamber rises because of the fact that a (small) pump provided in addition to the cooling medium pump delivers cooling medium into the switching chamber. When the pressure in the switching chamber exceeds a defined limit pressure, which with given control voltage of the solenoid valve however is not sufficient for overcoming the magnetic force acting on the armature, the valve plunger of the solenoid valve is adjusted against the spring force of the pressure limiting spring despite energized winding and the valve opens despite armature adjusted in the direction of the core.

Preferably, for changing over from the small coolant circuit to the large coolant circuit the solenoid valve is opened in particular by way of a suitably low control voltage below the control voltage that is necessary for adjusting the armature in the direction of the core. The resetting spring of the solenoid valve that is preferentially provided ensures in this case an adjustment of the valve plunger out of its closing position and a resetting of the armature axially away from the core.

It is particularly practical when the solenoid valve, the slide for switching over between the cooling circuits, the cooling medium pump are arranged in a common housing that is preferentially formed as a cast metal housing.

BRIEF DESCRIPTION OF THE DRAWINGS

Further advantages, features and details of the invention are obtained from the following description of preferred exemplary embodiments and by way of the drawings.

These show in.

DETAILED DESCRIPTION

Figure 1B:
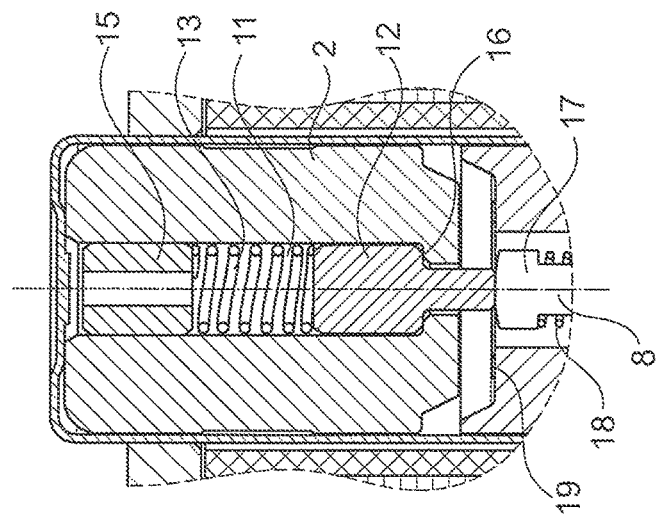
FIG. 1a a solenoid valve designed according to the concept of the invention in the dropped-out state, FIG. 1b a detail X from FIG. 1a, FIG. 2a the solenoid valve according to FIG. 1a in the energized yet, because of its pressure limiting functionality, in the opened state, FIG. 2b a detail X from FIG. 2a, FIG. 3 greatly schematically an alternative embodiment, in which a pressure limiting spring and a pin are not integrated in the armature as in the preceding exemplary embodiments, but arranged in a cage that is provided between the armature and the valve plunger, FIG. 4 highly schematically, an internal combustion engine cooling system with a solenoid valve designed according to the concept of the invention in a merely hinted state.

In the figures, same elements and elements with the same function are marked with the same reference characters.

Figure 1A:
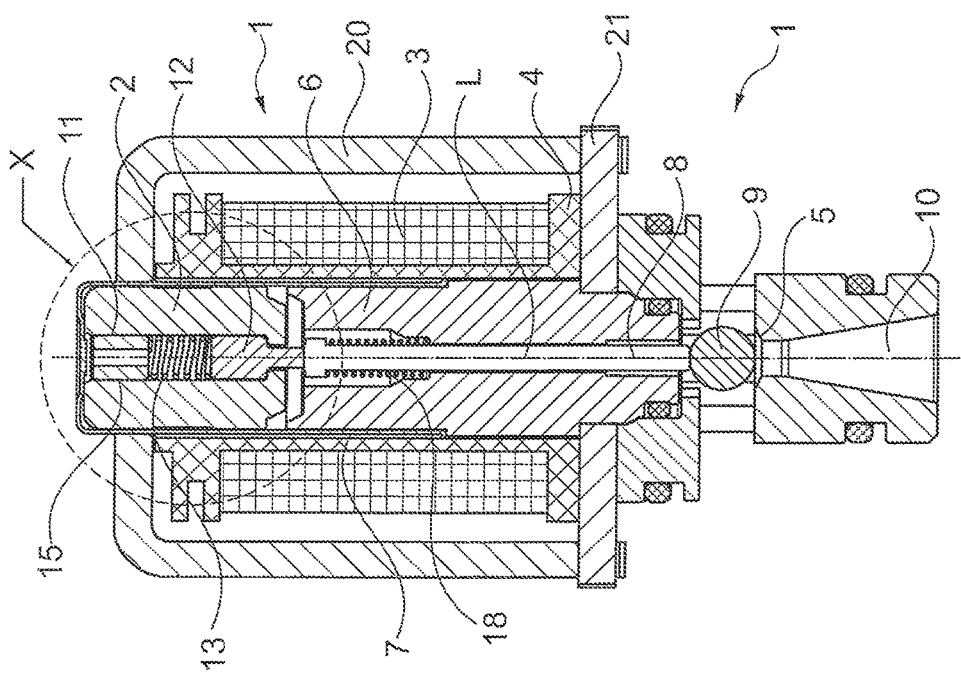
Figure 4:
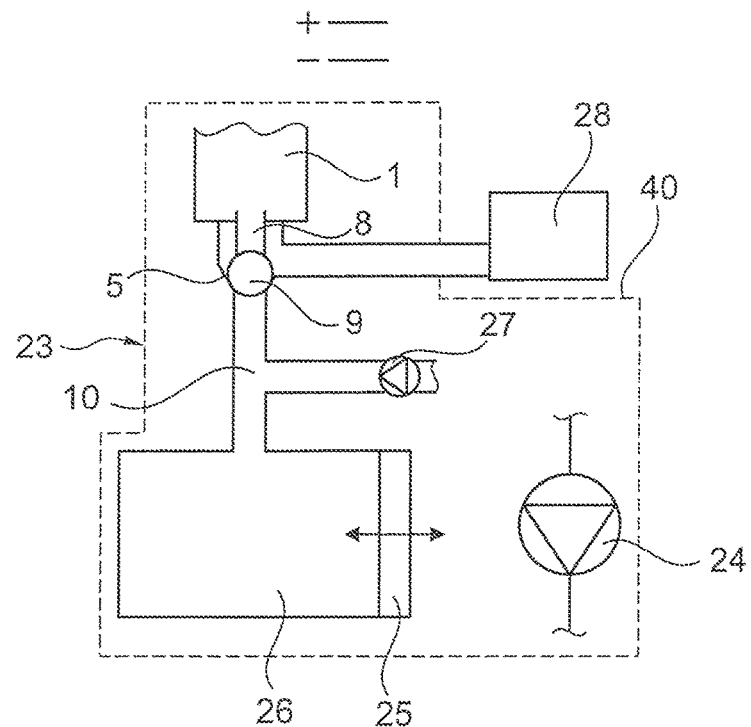

In FIGS. 1a and 1b, a voltage-controlled solenoid valve 1 is shown, preferably for use in an internal combustion engine cooling system, as exemplarily shown in FIG. 4.

The solenoid valve 1 comprises an armature 2, which is axially adjustable along a longitudinal axis L (adjusting axis) by energizing an electrical winding 3, which is arranged on a coil holder 4, namely in the direction of a valve seat 5. In FIGS. 1a and 1b, the dropped-out state is shown, i.e. a state in which the winding 3 is not energized or the applied control voltage is not sufficient to adjust the armature 2 axially along the longitudinal axis L towards a core 6.

From FIG. 1a it is evident that the armature 2 is longitudinally adjustably guided in an armature guiding pot 7, into which the core 6 is pushed.

The core 6 is axially penetrated by an elongated valve plunger 8 which extends along the longitudinal axis L, which, with its end facing away from the armature 2, interacts with a closing body 9 designed as a ball in this case and presses the same into its valve seat 5 when the winding 3 is energized, thereby closing a fluid line 10, in this case specifically a bypass.

As is directly evident from FIGS. 1a and 1b, the armature 2 does not directly interact with the valve plunger 8 but by way of a pin 12 which is adjustable within the armature 2, more precisely within a central armature bore 11 (passage opening) along the longitudinal axis L, which pin 12 is spring force-loaded in the direction of a closing position of the valve plunger 8, i.e. in the direction of the valve seat 5 which is likewise received in the armature bore 12.

The pressure limiting spring 13 supports itself with its end facing away from the pin 12 on an abutment element 15, which is designed here as press-in bush, which is axially pressed into the armature bore 11 (a central bore) from the back, i.e. from a side facing away from the pin 12. The press-in depth in this case determines the preload of the pressure limiting spring 13.

Viewing it together it is evident that within the armature 2 on a side of the pin 12 facing away from the pressure limiting spring 13 a pin stop 16 designed as annular shoulder is realised within the armature 2 in order to limit the relative adjusting movement of the pin 12 relative to the armature 2 in the direction of the valve seat 5.

The pin 12 axially supports itself on a thickened end 17 of the valve plunger 8 and thus adjusts the valve plunger 8 upon adequate energizing of the winding 3 in the direction of a closing position, i.e. in the direction of the valve seat 5.

The aforementioned adjusting movement is counteracted by a resetting force 18, which supports itself on an annular face of the valve plunger 8 facing away from the pin 12, in the specific example of the end 17. The pressure limiting spring 13 in this case is designed stronger than the resetting spring 18.

To optimise the magnetic flux circuit, armature 2 and core 6 interact by way of conical faces, wherein for avoiding sticking of the armature 2 on the core 6 suitable non-stick means 19, for example a non-stick disc or grooving can be provided.

When an adequate control voltage is applied to the solenoid winding 3, a magnetic force acts on the armature 2 so that the same is adjusted in a position shown in FIGS. 2a and 2b in the direction of the core, i.e. in the direction of the valve seat 5. The magnetic flux in this case runs via a metallic housing 20 and the armature guiding pot 7 into the armature 2 and through the same axially in the direction of the core 6, wherein an axial air gap between armature 2 and core 6 is overcome and the magnetic flux in the drawing plane within the core 6 runs further down to a yoke plate 21 and within the same radially to the outside again into the pot-like or yoke-like metal housing 20.

By adjusting the armature 2 in the axial position shown in FIGS. 2a and 2b, the pin 12 presses along the longitudinal axis L against the valve plunger 8 in the direction of its closing position, as a result of which the same with adequately low pressure in the fluid line 10 or below the valve seat 5, closes the valve or the fluid line 10.

When the compressive force within the fluid line 10 rises (i.e. in a region in front of the valve seat) to a value that is greater than the closing force resulting from the magnetic force and the resetting spring force, the armature 2 is axially pressed from the valve seat 5 despite the energization of the winding 3 and the valve opens. Because of the provided pressure limiting functionality, the valve however also opens when the magnetic force with corresponding high control voltage is so high that the compressive force is not sufficient to axially adjust the closing body 9 and the valve plunger 8 including the armature 2 away from the core 6. For if the compressive force is sufficient in order to overcome the resulting force from the spring force of the pressure limiting spring 13 and the resetting spring 18, the closing body 9 and the valve plunger 8, with the armature adjusted in the direction of the core, are moved out of a closing position and the pressure limiting spring 13 is further preloaded through a resulting axial adjusting of the pin 12. The pin 12 in this case moves relatively axially within the and to the armature 2, which remains in its axial position. Because of this, impermissible excess pressures in the fluid line 10 can be avoided.

Figure 3:
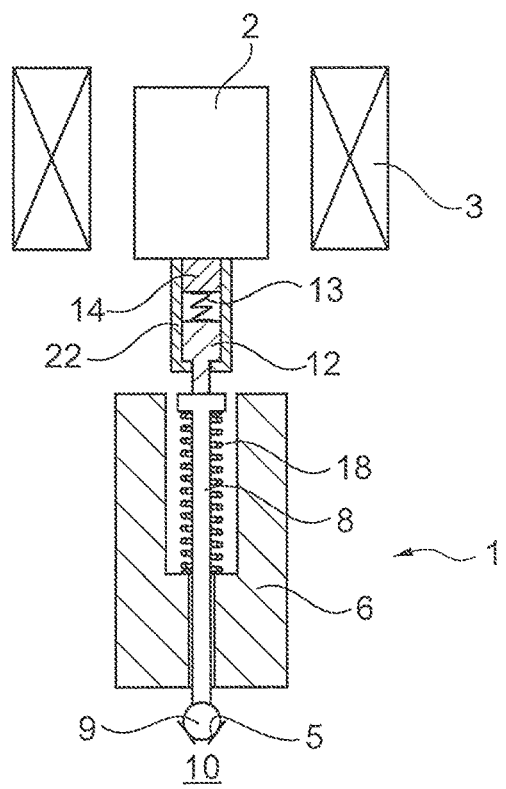

The exemplary embodiment of a solenoid valve 1 according to FIG. 3 differs in principle from the previously explained embodiment in that the pin 12 and the pressure limiting spring 13 are not received in the armature 2 but in a cage 22 which is either fixed on the armature 2 or preferably separate from this, which is axially located between the armature 2 and the valve plunger 8.

Located opposite, the resetting spring 18 supports itself in an axial bore on the core 6.

The cage 22 prevents an impermissible elongation of the pressure limiting spring 13.

On the side facing away from the pin 12, the pressure limiting spring 13 supports itself on an abutment element 15 fixed in the cage 22.

The axial length of the exemplary embodiment according to FIG. 3 is greater than that of the exemplary embodiment described previously. The functionality however is the same in principle so that with respect to the function reference is made to the previous explanations.

In FIG. 4, an internal combustion engine cooling system 23 is shown in a greatly schematic manner. This comprises a cooling medium pump 24 (circulating pump) for delivering cooling medium, in particular cooling water in two circuits.

For switching over between the circuits a hydraulically actuatable slide 25 is provided, upstream of which a switching chamber 26 is arranged, into which cooling medium is continuously fed via a small pump 27 which is designed for example as a piston pump.

With closed solenoid valve 1, i.e. with the closing body 9 bearing against the valve seat 5, the pressure in the switching chamber 26 rises as a consequence and the slide 25 is moved so that a small cooling medium circuit is switched open. For switching over to a large coolant circuit, the pressure in the switching chamber 26 has to be lowered. This can be realised for example by a suitably low, preferentially temperature-dependent control voltage on the solenoid valve 1, so that its armature is adjusted in an axial direction away from the valve seat 5 and thus opens the solenoid valve and thus opens a bypass to a cooling medium tank 28.

When the control voltage applied to the solenoid valve 1 is high for example because of a high cooling medium temperature and the pressure in the switching chamber 26 rises but not so high that the armature 2 can be adjusted against the active magnetic force, the solenoid valve 1 opens nevertheless because of the realised pressure limiting functionality, in that the pressure limiting spring within the solenoid valve is further preloaded, because of an axial movement of the closing body 9, of the valve plunger 8 and of the pin 12, so that as a result the valve opens and pressure can be removed in the direction of the cooling medium tank 28.

It is particularly practical when the solenoid valve, the slide for switching over between the cooling circuits, the cooling medium pump are arranged in a common housing that is preferentially formed as a cast metal housing, schematically illustrated in FIG. 4 at 40.

What is claimed:

1. A solenoid valve (1) for closing a bypass in a coolant circuit of an internal combustion engine, with an energizable winding (3) and an armature (2) that is adjustable in the direction of a core by energizing the winding, which armature (2) force-loads a valve plunger (8) in the direction of a closing position against the spring force of a resetting spring (18) when the winding (3) is energized, wherein a pin (12) is adjustable together with the armature for adjusting the valve plunger (8) in the direction of the closing position when the armature (2) is energized, whereby the valve plunger (8) can be force-loaded in the direction of the closing position, wherein the pin (12) is spring force-loaded by a pressure limiting spring (13) in the direction of the closing position of the valve plunger (8), whereby the valve plunger (8) is adjustable out of its closing position against the spring force of the pressure limiting spring (13) for opening the solenoid valve (1) despite the armature (2) being force-loaded in the direction of the core (6), wherein a magnetic flux circuit of the winding (3) and the pressure limiting spring (13) are designed so that in the case of a control voltage that is minimally necessary for closing the solenoid valve, the closing force exerted on the valve plunger (8) via the armature (2) is lower than the spring force exerted on the valve plunger (8) by the pressure limiting spring (13) and with a maximum control voltage, and a limit voltage between the minimum control voltage and the maximum control voltage, the closing force exerted on the valve plunger (8) by way of the armature (2) is greater than the spring force exerted on the valve plunger (8) by way of the pressure limiting spring (13).

2. The solenoid valve (1) according to claim 1, wherein means for maintaining a minimum pressures limiting spring preload are provided.

3. The solenoid valve (1) according to claim 1, wherein the pin (12) is arranged in an armature bore (11) of the armature (2).

4. The solenoid valve (1) according to claim 3, wherein the pressure limiting spring (13) spring force-loads the pin (12) against a pin stop (16) formed on the armature (2).

5. The solenoid valve (1) according to claim 3, wherein the pressure limiting spring (13) is arranged within the armature bore (11).

6. The solenoid valve (1) according to claim 5, wherein the pressure limiting spring (13) supports itself on the side facing away from the pin (12) on an abutment element (15) that is fixed in or on the armature (2), by way of the axial position of which relative to a pin stop (16) in the armature (2) the preload of the pressure limiting spring (13) is adjustable.

7. The solenoid valve (1) according to claim 1, wherein the pin (12) and the compression spring (13) are arranged in a cage that is arranged between the armature (2) and the valve plunger (8) for limiting a maximum elongation of the pressure limiting spring (13), wherein the cage with the valve plunger (8) located in the closing position is adjusted, at least in portions, axially into the core.

8. The solenoid valve (1) according to claim 7, wherein the pressure limiting spring (13) on the side facing away from the pin supports itself on an abutment element, fixed on or in the cage (22), through the axial position of which relative to a pin stop (16) in the cage (22) the preload of the pressure limiting spring (13) is adjustable.

9. The solenoid valve (1) according to claim 1, wherein a spring force of the pressure limiting spring (13) with the armature (2) adjusted in the direction of the core and the valve plunger (8) located in the closing position is greater than the spring force of the resetting spring (18).

10. The solenoid valve (1) according to claim 1, wherein the pin (12) supports itself directly on the valve plunger (8).

11. The solenoid valve (1) according to claim 1, wherein the valve plunger (8) interacts with a closing body (9) which by the valve plunger (8) in its closing position is pressed against a valve seat.

12. The solenoid valve (1) according to claim 1, wherein the solenoid valve (1) is voltage controlled.

13. The solenoid valve (1) according to claim 1, wherein the armature (2) with minimal voltage for closing the solenoid valve (1) with the valve plunger (8) in the closing position is spaced from the core (6) by way of a residual air gap or supports itself, with maximum permissible voltage, on the core (6), by way of a non-stick disc (19) or non-stick groove.

14. An internal combustion engine cooling system (23) with a cooling medium pump (24) and with a slide (25) for switching over between a small and a large coolant circuit, wherein the slide (25) is hydraulically actuatable by way of a cooling medium pressure in a switching chamber (26) and wherein a solenoid valve (1) according to claim 1 closes a bypass to a coolant tank, with the valve plunger (8) located in the closing position for increasing the cooling medium pressure and wherein, when there is an impermissibly high cooling medium pressure in the switching chamber (26), and despite energized winding (3) and an armature (2) adjusted in the direction of the core (6), because of the force exerted by the cooling medium, by way of a valve closing body, on the valve plunger against the spring force of the pressure limiting spring (13), the pin (12) moves out of the closing position to open the solenoid valve (1) and thereby open the bypass.

15. An internal combustion engine according to claim 14, wherein the solenoid valve (1), the slide (25) and the cooling medium pump (24) are arranged in a common cast metal housing.

* * * * *